US006857026B1

(12) United States Patent
Cain

(10) Patent No.: US 6,857,026 B1
(45) Date of Patent: Feb. 15, 2005

(54) USING ALTERNATE ROUTES FOR FAIL-OVER IN A COMMUNICATION NETWORK

(75) Inventor: Bradley Cain, Cambridge, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/460,566

(22) Filed: Dec. 14, 1999

(51) Int. Cl.[7] .............................................. G06F 15/16
(52) U.S. Cl. ...................... 709/239; 709/227; 709/229; 709/245; 714/1; 714/4; 370/389; 370/396
(58) Field of Search ................................ 709/227, 229, 709/237, 238, 239, 240, 242, 245; 714/1, 4; 370/389, 392, 396

(56) References Cited

U.S. PATENT DOCUMENTS

| | | | | |
|---|---|---|---|---|
| 5,115,433 A | * | 5/1992 | Baran et al. | |
| 5,491,694 A | * | 2/1996 | Oliver et al. | |
| 5,509,123 A | * | 4/1996 | Dobbins et al. | |
| 5,557,748 A | * | 9/1996 | Norris | |
| 5,588,121 A | * | 12/1996 | Reddin et al. | |
| 5,600,644 A | * | 2/1997 | Chang et al. | 370/396 |
| 5,710,908 A | * | 1/1998 | Man | |
| 5,721,819 A | * | 2/1998 | Galles et al. | |
| 5,802,316 A | * | 9/1998 | Ito et al. | 709/238 |
| 5,845,086 A | * | 12/1998 | Doebrich et al. | 709/238 |
| 5,881,246 A | * | 3/1999 | Crawley et al. | 709/238 |
| 5,905,729 A | * | 5/1999 | Gaddis et al. | |
| 5,905,872 A | * | 5/1999 | DeSimone et al. | 709/245 |
| 5,909,440 A | * | 6/1999 | Ferguson et al. | 370/389 |
| 5,917,805 A | * | 6/1999 | Manning et al. | |
| 5,918,016 A | * | 6/1999 | Brewer et al. | 709/242 |
| 5,938,736 A | * | 8/1999 | Muller et al. | |
| 5,956,339 A | * | 9/1999 | Harada et al. | 370/400 |
| 5,964,841 A | * | 10/1999 | Rekhter | 209/242 |
| 5,978,364 A | * | 11/1999 | Melnik | 370/289 |
| 6,032,192 A | * | 2/2000 | Wegner et al. | 709/238 |
| 6,112,247 A | * | 8/2000 | Williams | 709/227 |
| 6,147,971 A | * | 11/2000 | Rochberger et al. | |
| 6,304,912 B1 | * | 10/2001 | Oguchi et al. | 709/238 |
| 6,401,030 B1 | * | 6/2002 | Watanabe et al. | 701/202 |
| 6,567,380 B1 | * | 5/2003 | Chen | 370/238 |
| 6,728,779 B1 | * | 4/2004 | Griffin et al. | 709/239 |
| 6,731,729 B2 | * | 5/2004 | Eng et al. | 379/121.03 |
| 6,744,775 B1 | * | 6/2004 | Beshai et al. | 370/409 |
| 2002/0021675 A1 | * | 2/2002 | Feldman | |

* cited by examiner

Primary Examiner—Rupal Dharia
Assistant Examiner—Stephon Willett
(74) Attorney, Agent, or Firm—Steubing McGuinness & Manaras LLP

(57) ABSTRACT

Using alternate routes for fail-over in a communication network involves maintaining a preferred route and an alternate route in a routing table and routing protocol messages according to the alternate route when the preferred route is unavailable. A node obtains multiple routes for a destination, prioritizes the routes, and installs multiple routes in the routing table, including at least the preferred route and the alternate route. When the node receives a protocol message, the node searches the routing table for a highest priority route that is available for routing the protocol message, and routes the protocol message according to the highest priority route that is available for routing the protocol message. When a route becomes unavailable, the node updates the routing table to indicate that the route is unavailable, and may compute new routes and/or re-prioritize existing routes.

30 Claims, 5 Drawing Sheets

USING ALTERNATE ROUTES FOR FAIL-OVER IN A COMMUNICATION NETWORK

CROSS-REFERENCE TO RELATED APPLICATION

The present application may be related to the commonly-owned U.S. patent application Ser. No. 09/460,589 entitled USING DISTANCE-VECTOR INFORMATION TO COMPUTE NON-SHORTEST-PATH ROUTES FOR A LINK STATE ROUTING PROTOCOL, which was filed on even date herewith in the name of Bradley Cain, and is hereby incorporated herein by reference in its entirety.

FIELD OF THE INVENTION

The present invention relates generally to communication systems, and more particularly to using alternate routes for fail-over in a communication network.

BACKGROUND OF THE INVENTION

In today's information age, communication networks are often used for interconnecting computers and computer peripherals. A communication network typically includes a number of nodes that interoperate to route protocol messages. The various nodes in the communication network utilize various routing protocols in order to determine the routes that are used to route the protocol messages.

One type of routing protocol, known as a "link state" routing protocol, determines routes based upon the status of communication links between the various nodes. A link state routing protocol, such as the Open Shortest Path First (OSPF) routing protocol, requires each node to have complete topology information. The various nodes in the communication network exchange link state information by sending link state advertisement (LSA) protocol messages at various times.

Another type of routing protocol, known as a "distance vector" routing protocol, determines routes based upon the "distance" between the various nodes. A distance vector routing protocol, such as the Routing Information Protocol (RIP), requires each node to determine its distance to each destination in the communication network. Each node advertises its distance-vector information by periodically broadcasting its distance-vector information to the other nodes in the communication network.

In a typical communication network, it is often the case that there are multiple possible routes from a particular node to a particular destination. When there are multiple possible routes from the node to the destination, one of the routes is selected as the preferred route based upon a predetermined priority scheme. The preferred route is used to route protocol messages to the destination.

During normal operation of the communication network, it is possible for the preferred route to fail. When the preferred route fails, the node must compute a new route to the destination. Protocol messages processed prior to computing the new route are dropped.

SUMMARY OF THE INVENTION

In accordance with one aspect of the invention, a node maintains a preferred route and an alternate route in a routing table and routes protocol messages according to the alternate route when the preferred route is unavailable.

More particularly, a node obtains multiple routes for a destination, prioritizes the routes, and installs multiple routes in the routing table, including at least the preferred route and the alternate route. When the node receives a protocol message, the node searches the routing table for a highest priority route that is available for routing the protocol message, and routes the protocol message according to the highest priority route that is available for routing the protocol message. When a route becomes unavailable, the node updates the routing table to indicate that the route is unavailable, and may compute new routes and/or re-prioritize existing routes.

The preferred route may be a shortest-path route, in which case the alternate route is a non-shortest path route. The alternate route may be associated with a different next-hop device than the preferred route. The alternate route may be supported on a different interface than the preferred route.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
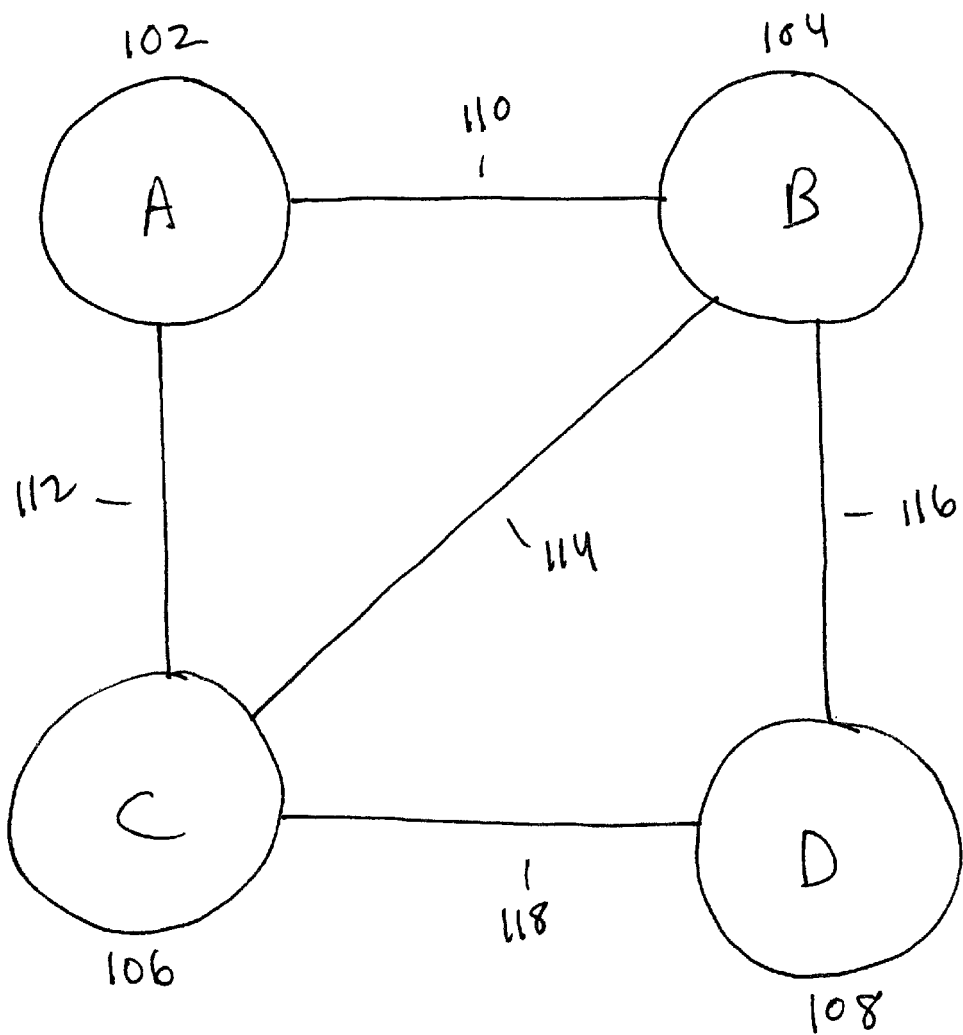
FIG. 1 is a network diagram showing an exemplary communication network including four interconnected nodes in accordance with an embodiment of the present invention.

In an embodiment of the present invention, multiple routes for a particular destination are maintained in the routing table. One route is selected as the preferred route for the destination. When the preferred route is available, the preferred route is used for routing protocol messages to the destination. However, when the preferred route is unavailable, an alternate route is used for routing protocol messages to the destination. Because the alternate route is already in the routing table and does not need to be computed when the preferred route becomes unavailable, the alternate route provides an efficient fail-over mechanism for routing protocol messages.

More specifically, the node obtains multiple routes to the destination. The node may obtain the multiple routes in a variety of ways, including, but in no way limited to, running multiple routing protocols, computing multiple routes (for example, using well-known changes to the Dijkstra shortest path algorithm in order to compute non-shortest-path routes or determining multiple routes using distance-vector information), and through manual configuration of routes. The present invention is in no way limited to the way in which routes are obtained or computed.

The node then prioritizes the routes. The node may prioritize the routes based upon a number of criteria, including, but in no way limited to, distance-vector information, link state information, the routing protocol (for example, favoring OSPF routes over RIP routes), the next-hop device (for example, selecting an alternate route having a different next-hop device than the preferred route), the network interface (for example, selecting an alternate route having a different network interface than the preferred route), and other policy considerations. The node preferably associates each route with a weight that indicates the relative priority of the route. The present invention is in no way limited to the way in which routes are prioritized.

One way for the node to select and prioritize routes is described in the related patent application entitled USING DISTANCE-VECTOR INFORMATION TO COMPUTE NON-SHORTEST-PATH ROUTES FOR A LINK STATE ROUTING PROTOCOL, which was incorporate by reference above. In particular, a link state routing protocol utilizes link state information received from the other nodes to determine a preferred route, and utilizes distance-vector information received from its neighbors to select one or more alternate routes.

The node installs multiple routes in the routing table, including at least a preferred route and an alternate route. Each route is preferably associated with a weight that indicates the relative priority of the route. The highest priority route that is available for routing protocol messages is considered to be the preferred route, and the next highest priority route that is available for routing protocol messages is considered to be the alternate route. The node uses the preferred route for routing protocol messages to the destination. It should be noted that the node may install any number of routes in the routing table for use in case of route failures, although the number of routes in the routing table affects routing performance, and so it may be desirable to install only two routes (i.e., a preferred route and an alternate route) in order to limit the number of routes that are maintained in the routing table.

During the normal course of operation, various routes may become unavailable. A route may become unavailable for many reasons, including, but in no way limited to, a node failure, a node reset, or a communication link failure. When a route becomes unavailable, the node updates the routing table to indicate that the route is unavailable. For example, the node may delete the unavailable route from the routing table or mark the route as being unavailable. The node may also compute new routes and/or re-prioritize any available routes. Assuming the preferred route becomes unavailable, the node continues routing protocol messages to the destination using an alternate route.

Because the routing table includes multiple routes for the destination, the node needs to select a route from among the routes in the routing table. Essentially, the node needs to find in the routing table the highest priority route that is available for routing protocol messages to the destination. Thus, the node must differentiate between routes having different priorities, and may need to determine whether particular routes are available or unavailable.

When prioritizing routes or selecting a route from among the routes in the routing table, it is preferably for the node to ensure that any route used for routing protocol messages does not create a forwarding loop. The node typically uses a routing algorithm to verify that a particular route does not create a forwarding loop.

FIG. 1 is a network diagram showing an exemplary communication network 100 including four interconnected nodes, namely Node A (102), Node B (104), Node C (106), and Node D (108). Node A (102) is coupled to Node B (104) via the communication link AB (110) and to Node C (106) via the communication link AC (112). Node B (104) is coupled to Node A (102) via the communication link AB (110), to Node C (106) via the communication link BC (114), and to Node D (108) via the communication link BD (116). Node C (106) is coupled to Node A (102) via the communication link AC (112), to Node B (104) via the communication link BC (114), and to Node D (108) via the communication link CD (118). Node D (108) is coupled to Node B (104) via the communication link BD (116) and to Node C (106) via the communication link CD (118).

Each node determines various routes to the other nodes in the communication network, assigns a relative priority to each route, and installs at least a preferred route and an alternate route in its routing table. For example, Node A (102) may determine that there are four (4) possible routes to Node D (108), namely routes ABD, ACD, ABCD, and ACBD, by running multiple routing protocols, by computing multiple routes, through manual configuration of routes, or by some other means. Node A (102) then assigns a relative priority to each route using-some predetermined prioritization scheme, which may consider such criteria as distance-vector information, link state information, the routing protocol, the next-hop device, the network interface, and other policy considerations. For the sake of discussion, it is assumed that route ABD is the highest priority route as determined by the predetermined prioritization scheme (for example, route ABD may be the shortest-path route as determined by OSPF).

If the route ABD becomes unavailable, then Node A (102) must use an alternate route to route subsequent protocol messages to the destination. The route ABD can fail, for example, due to a failure of the communication link AB (110), a failure of Node B (104), or a failure of the communication link BD (116). If the route ABD becomes unavailable due to a failure of the communication link BD (116), then only the route ABD is affected. If the route ABD becomes unavailable due to a failure of the communication link AB (110), then routes ABD and ABCD are affected. If the route ABD becomes unavailable due to a failure of Node B (104), then routes ABD, ABCD, and ACBD are affected.

It is beneficial, then, to prioritize the routes such that the preferred route and the alternate route are associated with different next-hop devices and are supported over different network interfaces. It may be insufficient to prioritize the routes such that the preferred route and the alternate route are associated with different next-hop devices but are supported over the same network interface (for example, via a point-to-multipoint communication link). Likewise, it may be insufficient to prioritize the routes such that the preferred route and the alternate route are associated with the same next-hop device but are supported over different network interfaces (for example, via separate communication links). The selection of a robust alternate route is particularly important when only two routes (i.e., a preferred route and an alternate route) are installed in the routing table.

Thus, with reference again to FIG. 1, the predetermined prioritization scheme may select the route ACD as the alternate route, even if the route ACD is not as "good" as some other route according to a link-state determination or distance-vector determination. This is because the route ACD is unaffected by any failure that affects the route ABD (absent some other failure), and therefore it is highly likely that the route ACD will be available in case the preferred route ABD becomes unavailable.

Figure 2:
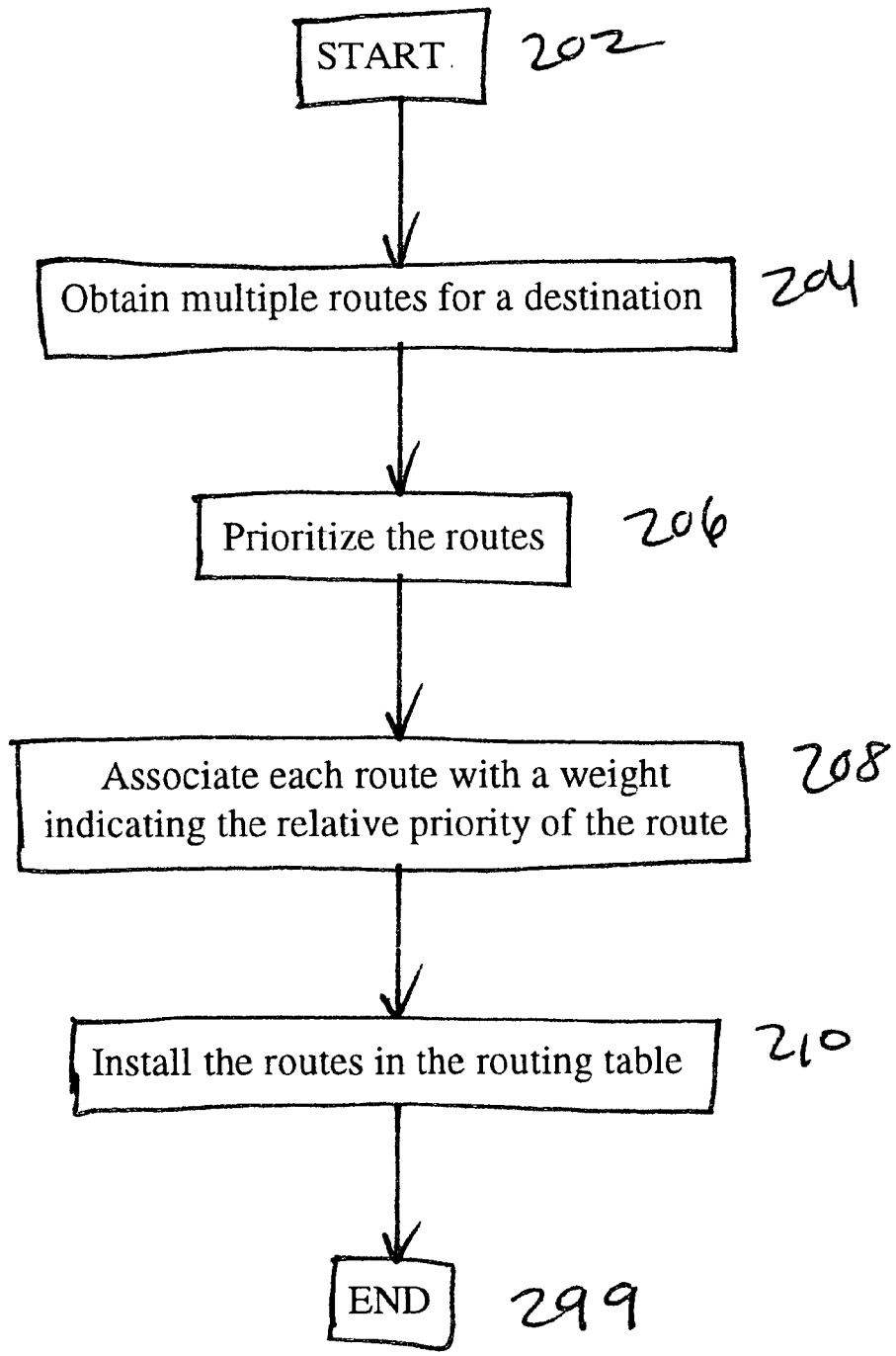
FIG. 2 is a logic flow diagram showing exemplary logic for installing routes in the routing table in accordance with an embodiment of the present invention.

FIG. 2 is a logic flow diagram showing exemplary logic 200 for installing routes in the routing table. Beginning at step 202, the logic obtains multiple routes for a destination, in step 204. The logic then prioritizes the routes according to a predetermined prioritization scheme, in step 206. The logic associates each route with a weight indicating the relative priority of the route, in step 208. The logic then installs multiple routes in the routing table, including at least a preferred route and an alternate route, in step 210. The logic 200 terminates in step 299.

Figure 3:
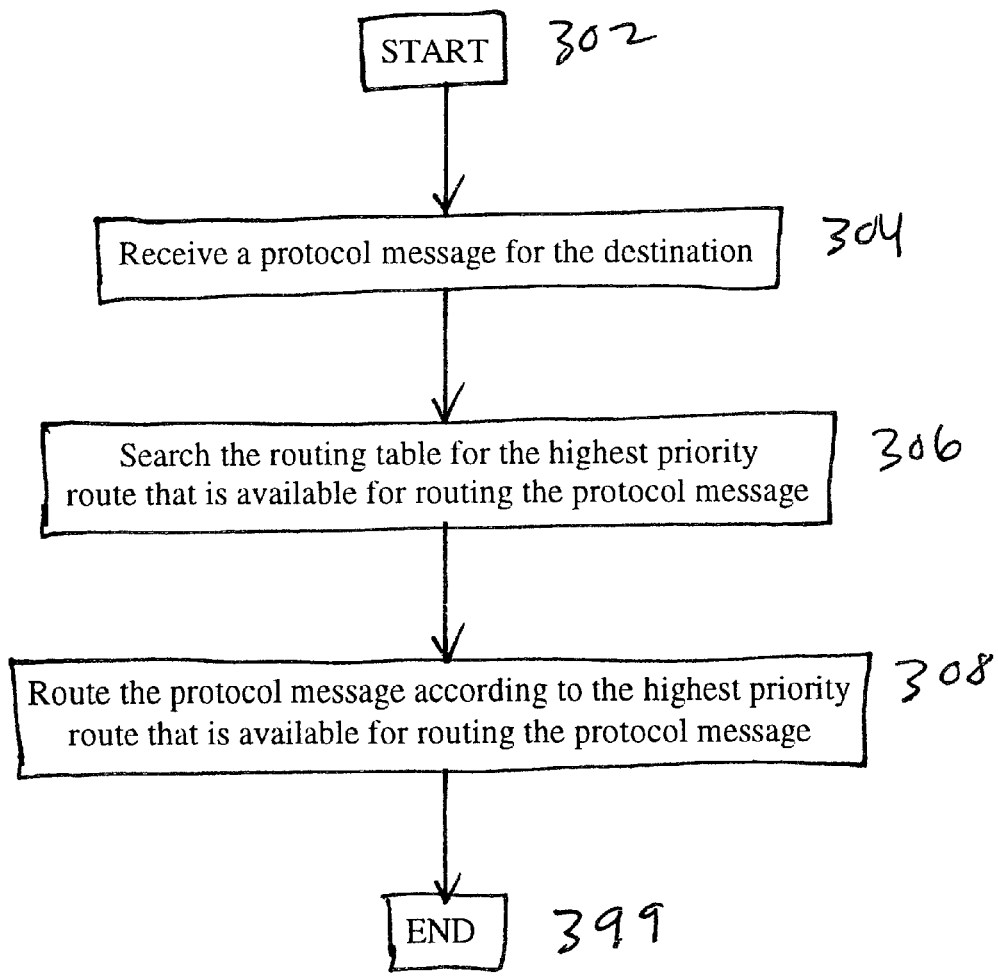
FIG. 3 is a logic flow diagram showing exemplary logic for routing a protocol message in accordance with an embodiment of the present invention.

FIG. 3 is a logic flow diagram showing exemplary logic 300 for routing a protocol message. Beginning, at step 302, and upon receiving a protocol message for the destination, in step 304, the logic searches the routing table for the highest priority route that is available for routing the protocol message, in step 306. Upon finding the highest priority route that is available for routing the protocol message, the logic routes the protocol message according to said highest priority route that is available for routing the protocol message, in step 308. The logic 300 terminates in step 399.

Figure 4:
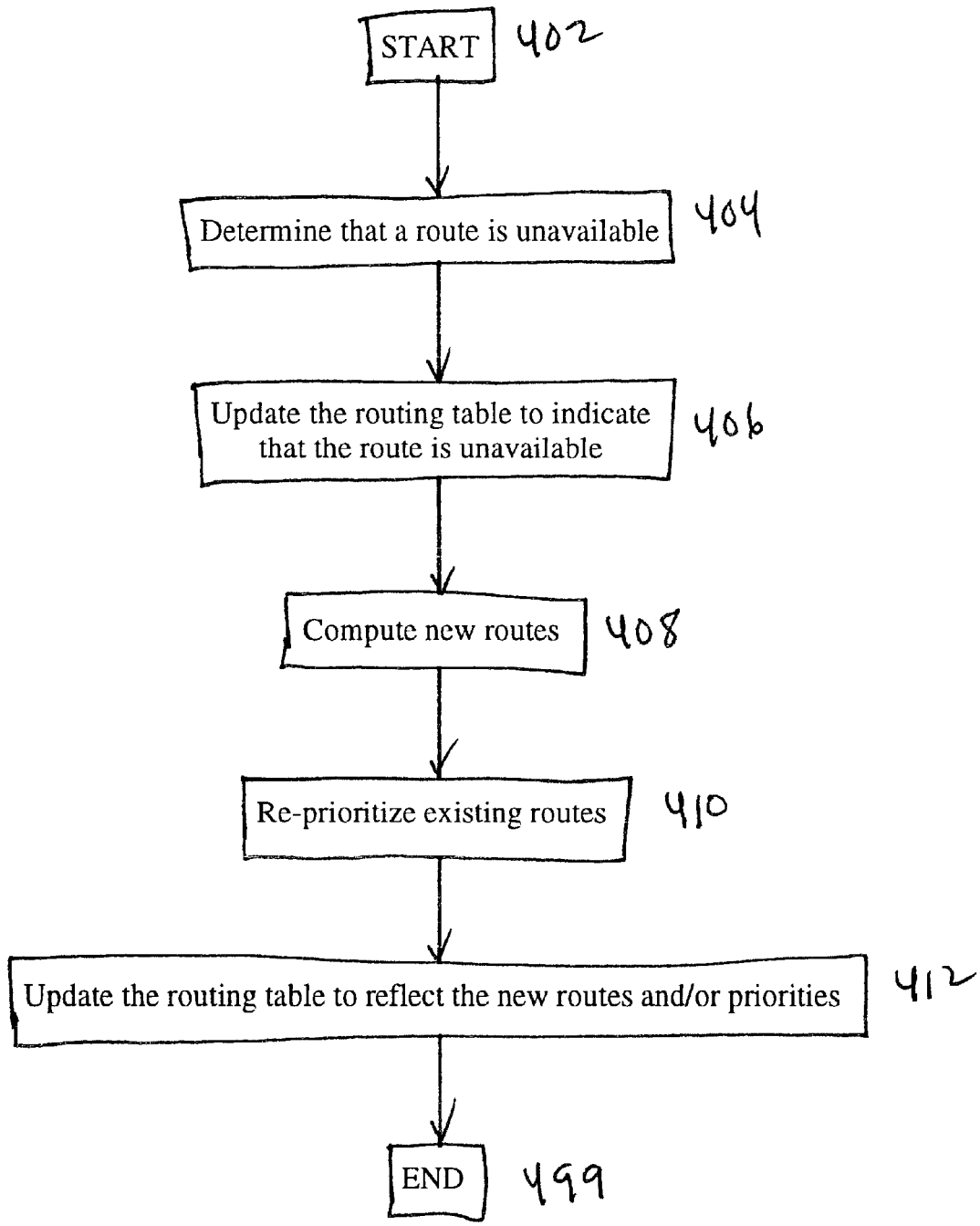
FIG. 4 is a logic flow diagram showing exemplary logic for maintaining routes in the routing table in accordance with an embodiment of the present invention.

FIG. 4 is a logic flow diagram showing exemplary logic 400 for maintaining routes in the routing table. Beginning at step 402, and upon determining that a route is unavailable, in step 404, the logic updates the routing table to indicate that the route is unavailable, in step 406, for example, by deleting the unavailable route from the routing table or marking the route as being unavailable. The logic may compute new routes, in step 408. The logic may re-prioritize existing routes, in step 410. The logic may update the routing table to reflect the new routes and/or priorities, in step 412. The logic 400 terminates in step 499.

Figure 5:
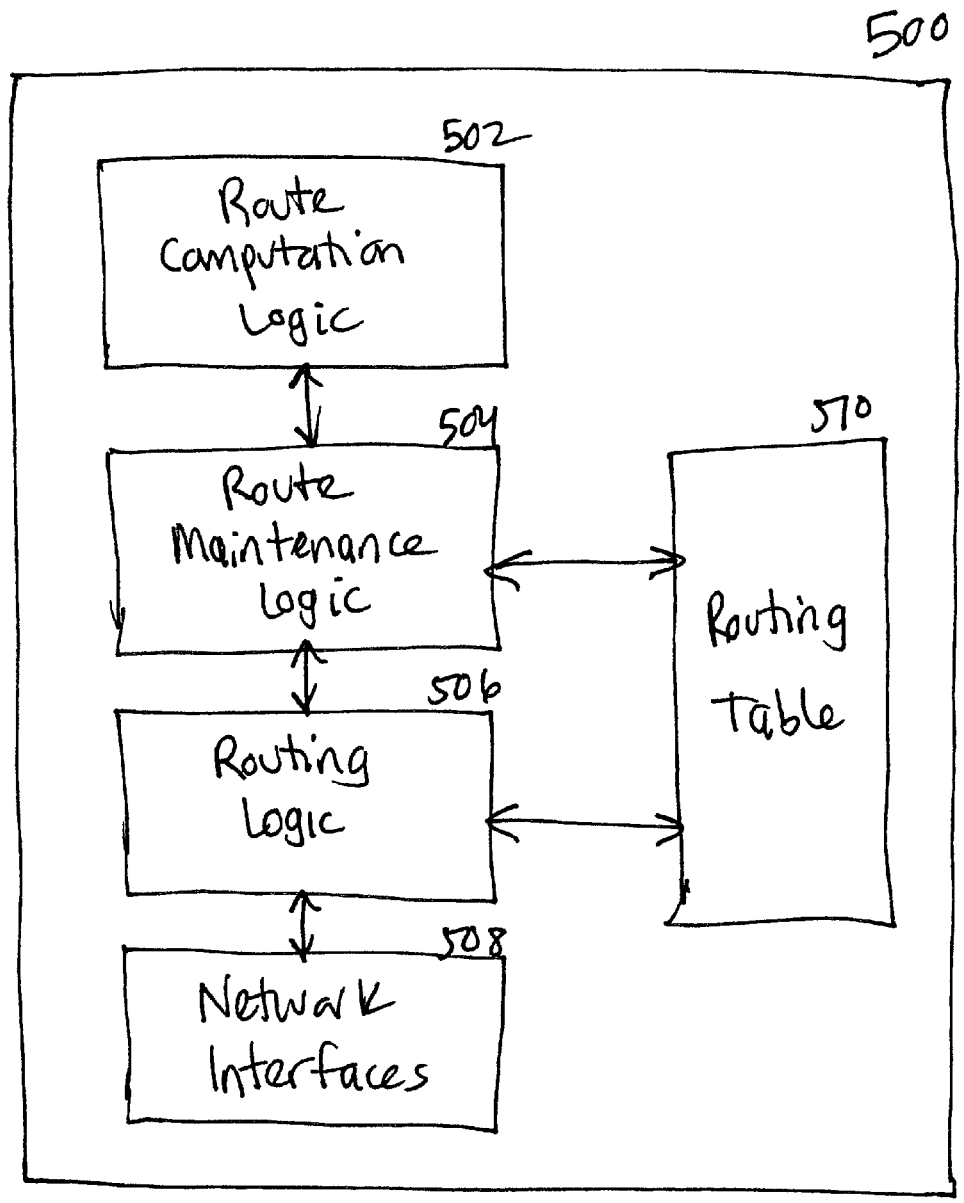
FIG. 5 is a block diagram showing a conceptual view of the relevant logic blocks of an exemplary node in accordance with an embodiment of the present invention.

FIG. 5 is a block diagram showing a conceptual view of the relevant logic blocks of an exemplary node 500. The node 500 includes, among other things, route computation logic 502, route maintenance logic 504, routing logic 506, network interfaces 508, and a routing table 510.

The route computation logic 502 computes one or more routes for a particular destination, for example, by running multiple routing protocols or computing multiple routes (for example, using well-known changes to the Dijkstra shortest path algorithm in order to compute non-shortest-path routes or determining multiple routes using distance-vector information).

The route maintenance logic 504 installs routes in the routing table 510. Specifically, the route maintenance logic 504 obtains routes, for example, from the route computation logic 502 and/or through manual configuration of routes. The route maintenance logic 504 prioritizes the routes according to a predetermined prioritization scheme. The route maintenance logic 504 installs multiple routes in the routing table 510, including at least a preferred route and an alternate route for the destination.

The routing logic 506 routes protocol messages according to the routes installed in the routing table 510 by the route maintenance logic 504. The routing logic receives protocol messages over the network interfaces 508, and routes protocol messages over the network interfaces 508 according to the highest priority route in the routing table 510 that is available for routing protocol messages. The routing logic also receives control messages over the network interfaces 508, and forwards the control messages to the route maintenance logic 504 in order for the route maintenance logic to determine the status of various routes and take appropriate actions, including computing new routes and/or reprioritizing existing routes.

It should be noted that some or all of the route maintenance logic 504 may be integrated into the routing logic 506, particularly for any real-time prioritization or selection of routes.

In an exemplary embodiment of the present invention, predominantly all of the logic for using alternate routes for fail-over, including prioritizing routes, installing routes in the routing table, maintaining routes in the routing table, determining the preferred route, and routing protocol messages according to the preferred route is implemented as a set of computer program instructions that are stored in a computer readable medium and executed by an embedded microprocessor system within the node. Various embodiments of the invention may be implemented in any conventional computer programming language. For example, an embodiment may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

I claim:

1. A method for utilizing alternate routes from a source node to a destination node for fail-over communication by the source node in a communication network, the method comprising:

maintaining a preferred route from the source node to the destination node in a routing table, the routing table accessed during operation for routing protocol messages;

maintaining, contemporaneously with the preferred route, an alternate route from the source node to the destination node in the routing table; and selecting either the preferred route or the alternate route for routing a protocol message responsive to an availability of the referred route.

2. The method of claim 1, wherein the preferred route is a shortest-path route as determined by a predetermined shortest path computation, and wherein the alternate route is a non-shortest-path route with respect to the predetermines shortest path computation.

3. The method of claim 1, wherein at least one of the preferred routes and the alternate routes includes at least one additional node in a path from the source node to the destination node.

4. The method of claim 1, wherein the preferred route is associated with a first weight, and wherein the alternate route is associated with a second weight less than the first weight.

5. The method of claim 1, wherein the preferred route from the source node to the destination node is associated with a first interface of the source node, and wherein the alternate route is associated with a second interface of the source node different than the first interface.

6. The method of claim 1, wherein the preferred route is associated with a first next hop node, and wherein the alternate route is associated with a second next-hop node different than the fist next-hop node.

7. An apparatus for utilizing alternate routes from a source node to a destination node for fail-over communication in a network, the apparatus comprising:
  a routing table accessed during operation for routing protocol messages between the source node and the destination node;
  route maintenance logic operably coupled to maintain a preferred route from the source node to the destination node and to contemporaneously maintain an alternate route from the source node to the destination node in the routing table; and
  routing logic operably coupled to select either the preferred route or the alternate route to route a protocol message responsive to an availability of the preferred route.

8. The apparatus of claim 7, wherein the preferred route is a shortest-path route as determined by a predetermined shortest path computation, and wherein the alternate route is a non-shortest path route with respect to the predetermines shortest path computation.

9. The apparatus of claim 7, wherein at least one of the preferred routes and the alternate routes includes at least one additional node in a path from the source node to the destination node.

10. The apparatus of claim 7, wherein the preferred route is associated with a fist weight, and wherein the alternate route is associated with a second weight less than the first weight.

11. The apparatus of claim 7, wherein the preferred route is associated with a first interface, and wherein the alternate route is associated with a second interface different than the first interface.

12. The apparatus of claim 7, wherein the preferred route is associated with a first next-hop node, and wherein the alternate route is associated with a second next-hop node different than the first next-hop node.

13. The apparatus of claim 7, wherein the route maintenance logic is operably coupled to obtain a plurality of routes from the source node to the destination node and prioritize the plurality of routes in order to determine the preferred route and the alternate route.

14. The apparatus of claim 13, wherein the route maintenance logic is operably coupled to associate each route with a weight indicating the relative priority for the route.

15. The apparatus of claim 14, wherein the route maintenance logic is operably coupled to install the preferred route and the alternate route in the routing table.

16. The apparatus of claim 15, wherein the routing logic is operably coupled to search the routing table for a highest priority route that is available for routing the protocol message.

17. The apparatus of claim 16, wherein the routing logic is operably coupled to route the protocol message according to the highest priority route that is available for routing the protocol message.

18. A program product comprising a computer readable medium having embodied therein a computer program for utilizing alternate routes from a source node to a destination node for fail-over communication by the source node in a communication network, the computer program comprising:
  route maintenance logic programmed to maintain a preferred route from the source node to the destination node and to contemporaneously maintain an alternate route from the source node to the destination node in a routing table that is accessed during operation to route protocol message between the source node and destination node; and
  routing logic programmed to select either the preferred route or the alternate route to route a protocol message responsive to an availability of preferred route.

19. The program product of claim 18, wherein the preferred route is a shortest-path route as determined by a predetermined shortest path computation, and wherein the alternate route is a non-shortest-path route with respect to the predetermines shortest path computation.

20. The program product of claim 18, wherein at least one of the preferred routes and the alternate routes includes at least one node in a path from the source node to the destination node.

21. The program product of claim 18, wherein the preferred route is associated with a first weight, and wherein the alternate route is associated with a second weight less than the first weight.

22. The program product of claim 18, wherein the preferred route is associated with a first interface of the nude, and wherein the alternate route is associated with a second interface of the node different than the first interface.

23. The prod product of claim 18, wherein the preferred route is associated with first next-hop node, and wherein the alternate route is associated with a second next-hop node different than the first next-hop node.

24. The program product of claim 18, wherein the route maintenance logic is programmed to obtain a plurality of mutes and prioritize the plurality of routes in order to determine the preferred route and the alternate route.

25. The program product of claim 24, wherein the route maintenance logic is programmed to associate each route with a weight indicating the relative priority for the route.

26. The program product of claim 25, wherein the route maintenance logic is programmed to install the preferred route and the alternate route in the routing table.

27. The program product of claim 26, wherein the routing logic is programmed to search the routing table for a highest priority route that is available for routing the protocol message.

28. The program product of claim 27, wherein the routing logic is programmed to route the protocol message according to the highest priority route that is available for routing the protocol message.

29. An apparatus comprising:
  route determination means for determining a plurality of routes from a source node to a destination node;

route prioritization means for prioritizing said plurality of routes into at least a preferred route and an alternate route, wherein at least one of the preferred route and the alternate route include an additional node disposed between the source node and the destination node;

routing table means for contemporaneously maintaining said preferred route and said alternate route, the routing table means accessed during operation to identify a route for forwarding message between the source node and the destination node; and routing means for selecting either the preferred route or the alternate route for routing a protocol message responsive to an availability of the preferred route.

30. A communication system comprising a plurality of interconnected nodes including at least a first node and a second node, wherein said first node is operably coupled to contemporaneously maintain at least a preferred route and an alternate route to said second node in a routing table, the routing table accessed during operation to provide ar toue and to route a protocol message to said second node using said alternate route when said preferred route is unavailable, wherein at least one of the preferred route and the alternate route include an third node disposed between the first node and the second node.

* * * * *

UNITED STATES PATENT AND TRADEMARK OFFICE
CERTIFICATE OF CORRECTION

| | |
|---|---|
| PATENT NO. | : 6,857,026 B1 |
| DATED | : February 15, 2005 |
| INVENTOR(S) | : Cain |

It is certified that error appears in the above-identified patent and that said Letters Patent is hereby corrected as shown below:

Column 6,
Line 58, should read -- on, identifying a plurality of routes from the source node to the destination node; ranking the identified routes; maintaining a best-ranked one of the identified routes as a preferred route --.
Line 63, should read -- a plurality of ranked alternate routes --.
Lines 65-67, should read -- if performance of the preferred route degrades to a predetermined level, selecting the next-best ranked alternate route as the preferred route for routing a protocol message. --.

Column 7,
Lines 3-4, should read -- routes are non-shortest-path routes with respect to the predetermined shortest path --.
Lines 11-12, should read -- associated with a first weight, and wherein each alternate route is associated with a respective weight --.
Lines 15-16, should read -- with a first interface of the source node, and wherein each alternate route is associated with a respective interface --.
Lines 19-21, should read -- associated with a first next hop node, and wherein each alternate route is associated with a respective next-hop node different then the first next-hop node. --.
Lines 31 and 39, should read -- node and to contemporaneously maintain a plurality of alternate routes --.
Line 34, should read -- ferred to one of the alternate routes --.
Lines 38-39, should read -- shortest path computation, and wherein the alternate routes are a non-shortest path route with respect to the predetermined --.
Line 42, should read -- preferred routes and the alternate routes include --.
Lines 46-47, should read -- is associated with a first weight, and wherein each alternate route is associated with a respective weight --.
Lines 50-51, should read -- is associated with a first interface, and wherein each alternate route is associated with a respective interface --.
Lines 54-55, should read -- is associated with a first-hop node, and wherein each alternate route is associated with a respective next-hop node --.
Line 61, should read -- preferred route and each alternate route. --.
Line 67, should read -- route and each alternate route --.

Column 8,
Lines 17-18, should read -- node and to contemporaneously maintain a plurality of alternate routes --.
Line 20, should read -- protocol messages between --.
Line 23, should read -- route or one of the alternate routes to route a --.
Lines 27-29, should read -- predetermined shortest path computation, and wherein each alternate route is non-shortest-path route with respect to the predetermined --.

UNITED STATES PATENT AND TRADEMARK OFFICE
CERTIFICATE OF CORRECTION

PATENT NO. : 6,857,026 B1
DATED : February 15, 2005
INVENTOR(S) : Cain

It is certified that error appears in the above-identified patent and that said Letters Patent is hereby corrected as shown below:

Column 8 (cont'd),
Line 31, should read -- of the preferred routes and the alternate routes include at least --.
Lines 35-36, should read -- ferred route is associated with a first weight and wherein each alternate route is associated with a respective weight --.
Lines 39-40, should read -- ferred route is associated with a first interface of the node, and wherein each alternate route is associated with a respective interface --.
Lines 44-45, should read -- route is associated with first next-hop node, and wherein each alternate route is associated with a respective next-hop node --.
Lines 49-50, should read -- routes and prioritize the plurality of routes in order to determine the preferred route and the alternate routes. --.
Line 56, should read -- route and the alternate routes in the routing table. --.

Column 9,
Lines 2-4, should read -- routes into at least a preferred route and a plurality of alternate routes, wherein at least one of the preferred route and the alternate routes include --.
Line 7, should read -- said preferred route and said alternate routes, --.
Line 9, should read -- route for forwarding messages between --.
Line 12, should read -- one of the alternate routes for routing --.

Column 10,
Line 5, should read -- first and second ranked alternate routes --.
Line 6, should read -- routing table accessed during operation to provide a route --.
Lines 8-10, should read -- the best-ranked one of said alternate routes when said preferred route is unavailable, wherein at least one of the preferred route and the alternate routes include a third node --.

Signed and Sealed this

Fourth Day of April, 2006

JON W. DUDAS
*Director of the United States Patent and Trademark Office*